(12) United States Patent
Bando

(10) Patent No.: US 10,357,864 B2
(45) Date of Patent: Jul. 23, 2019

(54) GLASS-PLATE WORKING APPARATUS

(71) Applicant: BANDO KIKO CO., LTD., Tokushima-shi, Tokushima (JP)

(72) Inventor: Kazuaki Bando, Tokushima (JP)

(73) Assignee: BANDO KIKO CO., LTD., Tokushima-shi, Tokushima (JP)

( * ) Notice: Subject to any disclaimer, the term of this patent is extended or adjusted under 35 U.S.C. 154(b) by 0 days.

(21) Appl. No.: 15/553,025

(22) PCT Filed: May 13, 2016

(86) PCT No.: PCT/JP2016/002349
§ 371 (c)(1),
(2) Date: Aug. 23, 2017

(87) PCT Pub. No.: WO2017/017870
PCT Pub. Date: Feb. 2, 2017

(65) Prior Publication Data
US 2018/0036856 A1  Feb. 8, 2018

(30) Foreign Application Priority Data

Jul. 28, 2015 (JP) ................................ 2015-149057

(51) Int. Cl.
*B24B 49/10* (2006.01)
*B24B 9/10* (2006.01)
(Continued)

(52) U.S. Cl.
CPC ............... *B24B 9/10* (2013.01); *B24B 41/06* (2013.01); *B24B 41/068* (2013.01); *C03C 19/00* (2013.01)

(58) Field of Classification Search
CPC ........... B24B 49/10; B24B 51/00; B24B 9/10; C03B 33/00; C03B 33/02; C03B 33/03
(Continued)

(56) References Cited

U.S. PATENT DOCUMENTS

| 5,415,581 A * | 5/1995 | Bando | ............... C03B 33/03 |
| | | | 125/23.01 |
| 5,759,222 A * | 6/1998 | Bando | ............... B24B 9/102 |
| | | | 65/105 |
| 7,059,938 B2 * | 6/2006 | Bando | ............... B65G 49/064 |
| | | | 451/12 |

FOREIGN PATENT DOCUMENTS

JP         6-75819      9/1994
JP      2000-237939    9/2000
(Continued)

OTHER PUBLICATIONS

International Search Report for PCT/JP2016/002349, dated Jul. 19, 2016, 4 pages.
(Continued)

*Primary Examiner* — Robert A Rose
(74) *Attorney, Agent, or Firm* — Nixon & Vanderhye P.C.

(57) ABSTRACT

A glass-plate working apparatus 1 includes: two grinding worktables 17A and 17B which undergo NC controlled movement or angularly controlled rotation independently of each other and a grinding head 18 which undergoes NC controlled movement in correspondence with the grinding worktables 17A and 17B, wherein the grinding worktables 17A and 17B are adapted to alternately move in a planar coordinate system in cooperation with the grinding head 18 and alternately repeat operation in which while one of the grinding worktables 17A and 17B, while holding a glass plate 2, is effecting the grinding of the glass plate 2 by the grinding head 18, the other one of the grinding worktables 17A and 17B effects an operation of discharging the glass plate 2 and receiving a next glass plate 2, to thereby allow the grinding head 18 to proceed with grinding on a continual basis.

6 Claims, 9 Drawing Sheets

(51) Int. Cl.
*B24B 41/06* (2012.01)
*C03C 19/00* (2006.01)

(58) Field of Classification Search
USPC .......................... 451/41, 44, 5, 334, 339, 59
See application file for complete search history.

(56) References Cited

FOREIGN PATENT DOCUMENTS

| | | |
|---|---|---|
| JP | 2009-054708 | 3/2009 |
| JP | 2009-160725 A | 7/2009 |
| JP | 2012-001384 | 1/2012 |
| WO | WO 2011/121895 | 10/2011 |
| WO | WO 2012/039075 | 3/2012 |

OTHER PUBLICATIONS

Written Opinion of the ISA for PCT/JP2016/002349, dated Jul. 19, 2016, 3 pages.
Notice of Reason for Rejection dated Feb. 26, 2019 in Japanese Application No. 2017-146277, with Summarized Translation (4 pages).

\* cited by examiner

GLASS-PLATE WORKING APPARATUS

This application is the U.S. national phase of International Application No. PCT/JP2016/002349 filed May 13, 2016 which designated the U.S. and claims priority to JP Application No. 2015-149057 filed Jul. 28, 2015, the entire contents of each of which are hereby incorporated by reference.

TECHNICAL FIELD

The present invention relates to a glass-plate working apparatus for cutting out glass plates, such as glass plates for window glass plates of automobiles and glass plates for other usage, from unworked glass plates and for effecting grinding of peripheral edges of the cut-out glass plates.

In addition, the present invention concerns a glass-plate working apparatus in which a scribing device and a bend-breaking and separating device for glass plates, on the one hand, and a grinding device, on the other hand, are connected via a sucking and transporting device, and glass plates which are continually cut out from the scribing device and the bend-breaking and separating device are consecutively supplied, as they are in their cut-out posture, to the grinding device, are continually subjected to grinding, and are consecutively discharged.

Furthermore, the present invention concerns a glass-plate working apparatus in which a scribing section, a bend-breaking section, a grinding section, and a glass-plate transporting device are operated by being NC controlled.

BACKGROUND ART

The glass-plate working apparatus is known from Patent Documents 1 and 2.

PRIOR ART DOCUMENTS

Patent Documents

Patent Document 1: JP-B-6-75819
Patent Document 2: JP-A-8-231238

SUMMARY OF THE INVENTION

Problems that the Invention is to Solve

In both glass-plate working apparatuses described in Patent Documents 1 and 2, the bend-breaking and separating device and the grinding device are connected via a glass-plate transporting device, and glass plates which are continually cut out from the bend-breaking device are adapted to be consecutively supplied to the grinding device, to be continually subjected to grinding, and to be consecutively discharged.

With such a glass-plate working apparatus, however, since one grinding worktable is provided in correspondence with the grinding head, upon each completion of the grinding of the glass plate supplied to and held on the grinding worktable, the grinding head moves away from the grinding worktable, returns to a standby point, and stops on standby. When the discharging of the glass plate from the grinding worktable and the receiving of a next glass plate thereon are completed, the grinding head advances toward the grinding worktable and starts grinding. Thus, an interruption time loss occurs on each occasion of delivery of the glass plate to and from the grinding worktable, so that production speed cannot be increased.

Accordingly, the present invention has been devised in view of the conventional drawbacks described above, and its object is to provide a glass-plate working apparatus which is capable of increasing the production speed, of obtaining grinding with high accuracy and uniform dimensions, and of effecting the supply and delivery of the glass plates to and from the grinding worktable with high accuracy.

Means for Solving the Problems

A glass-plate working apparatus in accordance with the present invention comprises: two grinding worktables which undergo NC controlled movement or angularly controlled rotation independently of each other; and a grinding head which undergoes NC controlled movement in correspondence with the two grinding worktables, wherein the two grinding worktables alternately move in a planar coordinate system in cooperation with the grinding head and alternately repeat operation in which while one of the grinding worktables, while holding a glass plate, is effecting the grinding of the glass plate by the grinding head, another one of the grinding worktables effects an operation of discharging a glass plate and receiving a next glass plate, to thereby allow the grinding head to effect the grinding of consecutively received glass plates on a continual basis.

In addition, a glass-plate working apparatus in accordance with the present invention comprises: a glass-plate transporting device; two grinding worktables which move independently of each other in a Y-axis direction perpendicular to a direction of transporting a glass plate by the glass-plate transporting device and which are arranged in the transporting direction of the glass plate; and a grinding head which moves in an X-axis direction parallel to the transporting direction, wherein the two grinding worktables are adapted to alternately repeat an operation of grinding a held glass plate by the grinding head and an operation of, during the grinding, discharging a ground glass plate and receiving and holding a next glass plate, and the grinding head is adapted to move in an X-Y planar coordinate system in a changing manner with the grinding worktable holding the glass plate and effect grinding on a continual basis.

Furthermore, a glass-plate working apparatus in accordance with the present invention comprises: two grinding worktables which undergo angularly controlled rotation independently of each other and move in a Y-axis direction perpendicular to a transporting direction of a glass plate; and a grinding head which moves in a planar coordinate system alternately in cooperation with each of the two grinding worktables, the two grinding worktables being arranged in series in the transporting direction of the glass plate, the grinding head being adapted to move in an X-axis direction which is the transporting direction of the glass plate, so as to be disposed alternately at a position corresponding to each of the two grinding worktables, wherein the two grinding worktables alternately repeat operation in which while one of the grinding worktables, while holding a glass plate, is effecting the grinding of the glass plate by the grinding head, another one of the grinding worktables effects an operation of discharging a glass plate and receiving a next glass plate, to thereby allow the grinding head to proceed with grinding on a continual basis.

In the above-described glass-plate working apparatus, two grinding worktables are provided in a grinding position, and the two grinding worktables are NC controlled independently of each other and are made to undergo coordinate movement under NC control together with one mutually common grinding head to effect grinding.

For this reason, with the glass-plate working apparatus in accordance with the present invention, while one grinding worktable is grinding the glass plate while undergoing coordinate movement with the grinding head, the other grinding worktable stops at its point of origin to effect the delivery of a glass plate to and from that grinding worktable. Upon completion of the grinding of the glass plate on the one grinding worktable, the grinding head advances to the other grinding worktable to effect grinding on a continual basis. The grinding head continually effects grinding alternately, i.e., in a changing manner, with respect to the glass plates on the two grinding worktables without requiring the standby stop after returning to the standby point. For this reason, it is possible to eliminate a loss time and obtain high production capability.

Additionally, with the glass-plate working apparatus in accordance with the present invention, since the glass plates on the two grinding worktables are ground by one grinding head, there is no variation in grinding dimensions of the glass plates on the two worktables, so that finishing becomes constant.

Furthermore, with the glass-plate working apparatus in accordance with the present invention, since the two grinding worktables are NC controlled mutually independently of each other, it is possible to effect grinding of glass plates of dimensions and shapes which differ between the two grinding worktables.

In addition, with the glass-plate working apparatus in accordance with the present invention, it is possible to effect the delivery of glass plates to and from the grinding worktables with high positional accuracy through cooperation between the two grinding worktables which are moved under NC control and the glass-plate transporting device which transports the glass plates similarly under NC control in a similar manner, and it is possible to effect accurate delivery in conformity with the locus of a contour line of grinding.

Advantages of the Invention

In accordance with the present invention, it is possible to provide a glass-plate working apparatus which is capable of increasing the production speed, of obtaining grinding with high accuracy and uniform dimensions, and of effecting the supply and delivery of the glass plates to and from the grinding worktable with high accuracy.

MODE FOR CARRYING OUT THE INVENTION

Hereafter, a more detailed description will be given of the preferred embodiments for carrying out the invention with reference to the drawings. It should be noted that the invention is not limited to these embodiments.

First Embodiment

Figure 1:
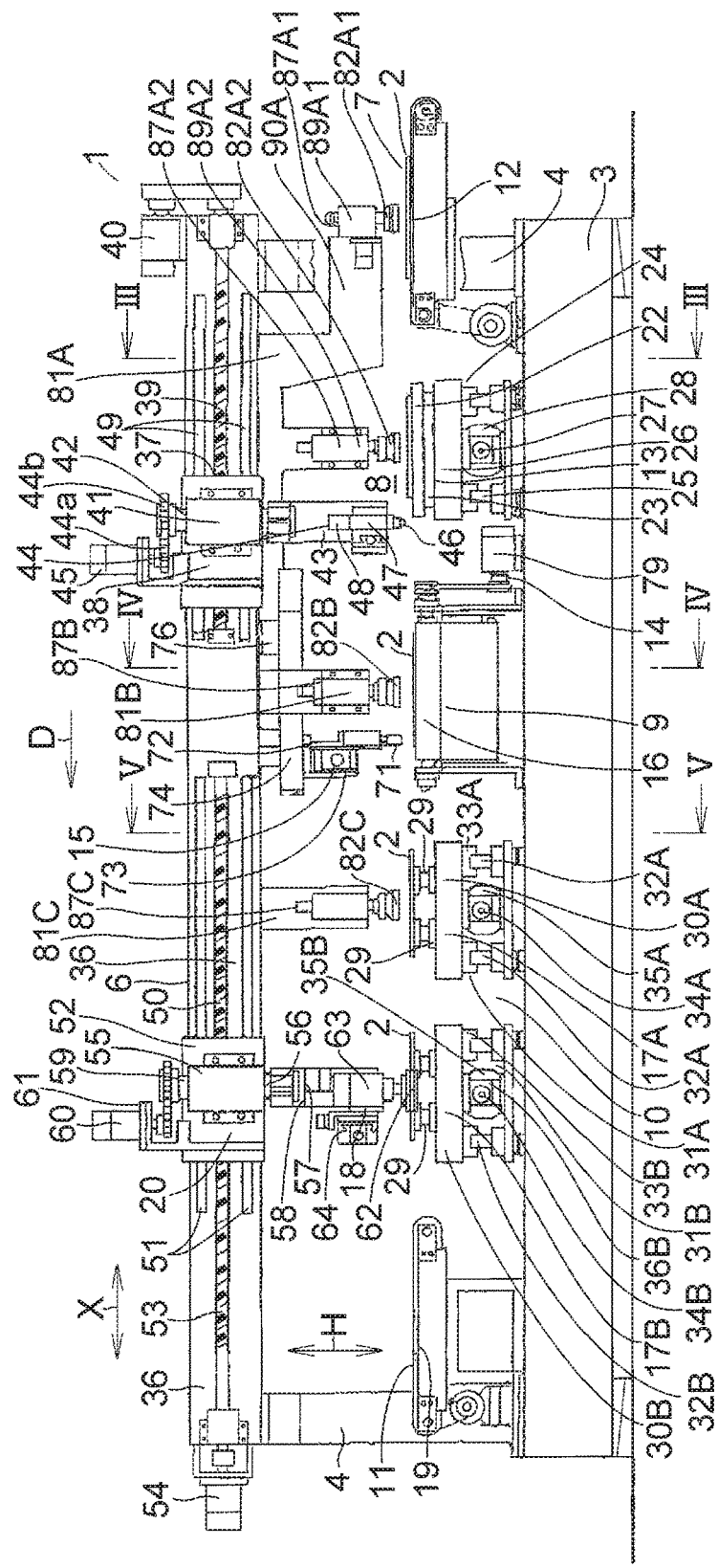
FIG. 1 is an explanatory front elevational view of an embodiment of the present invention.
Figure 2:
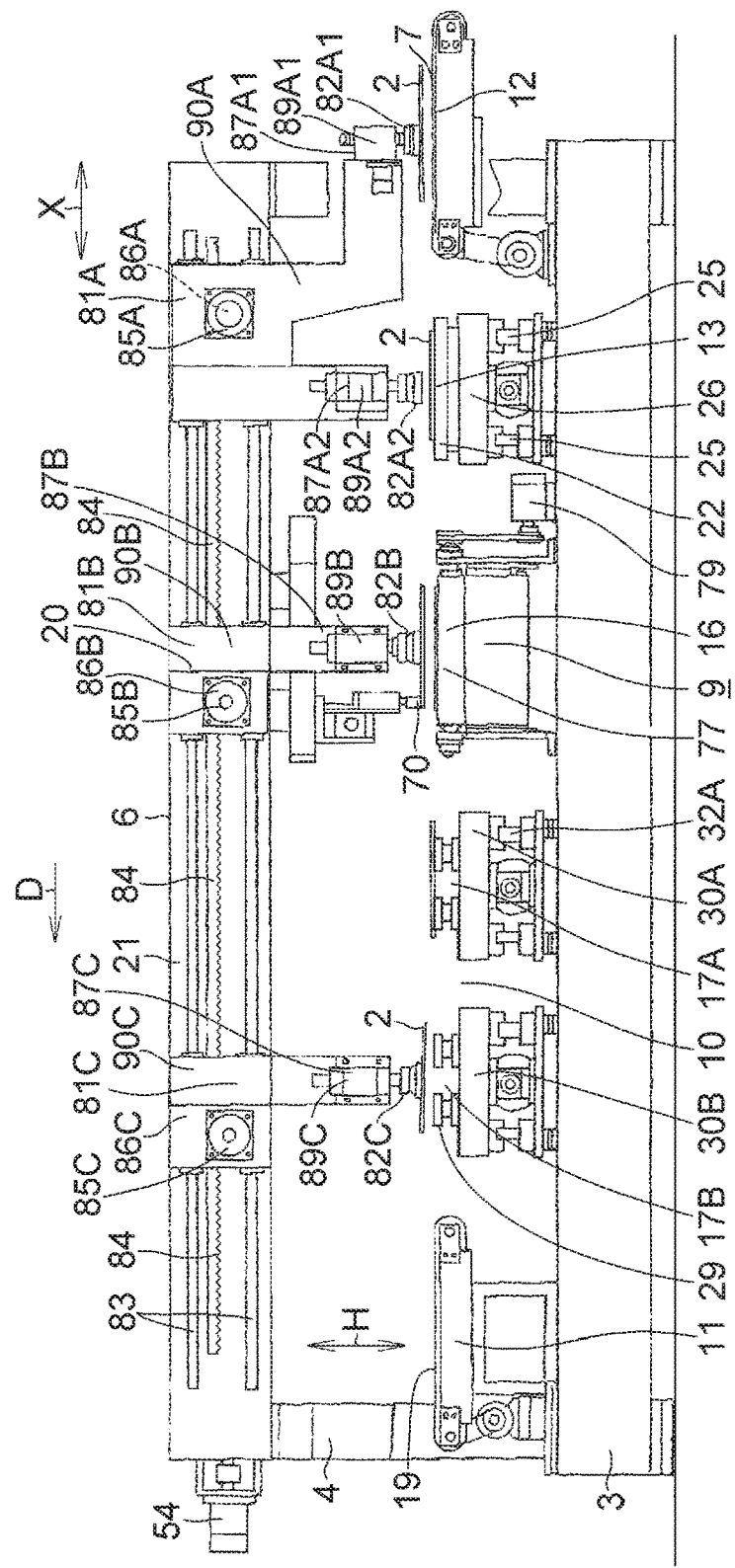
FIG. 2 is an explanatory rear view of the embodiment shown in FIG. 1.
Figure 3:
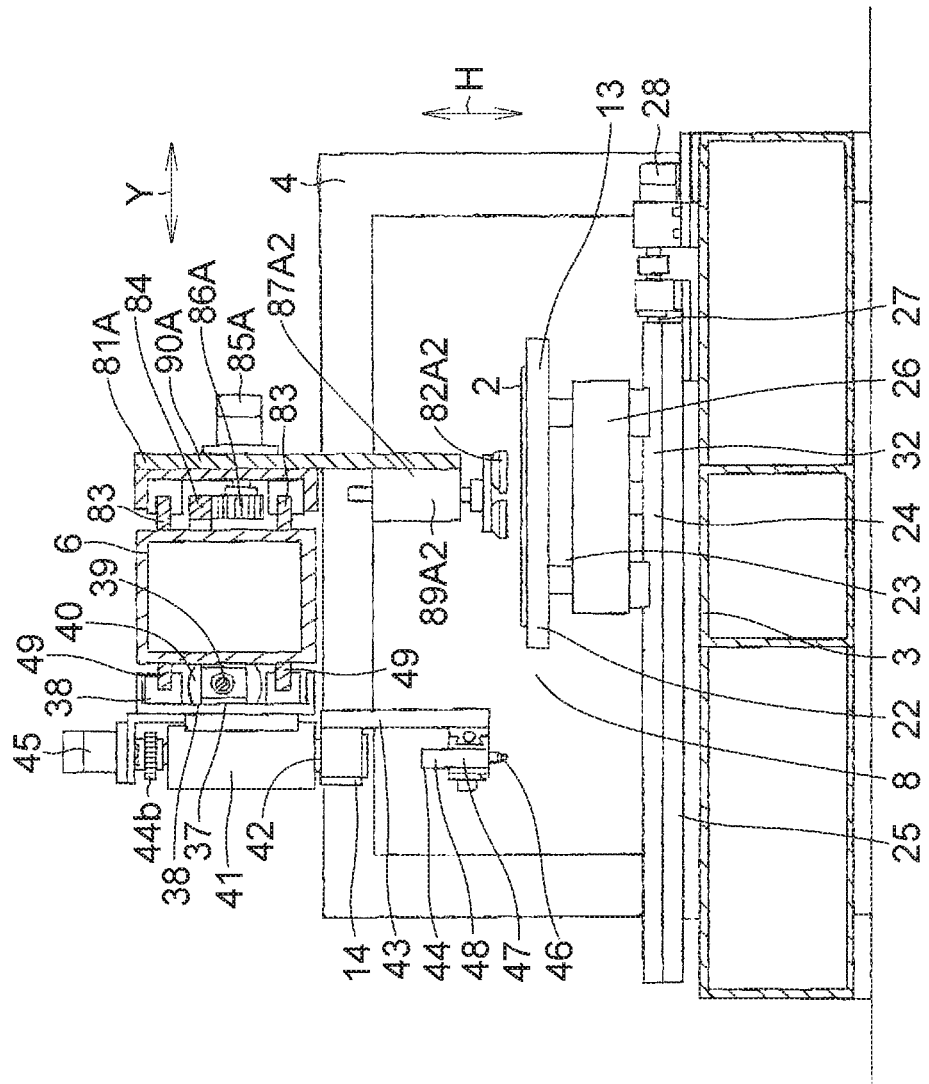
FIG. 3 is an explanatory cross-sectional view taken in the direction of arrows along line III-III of FIG. 1.
Figure 4:
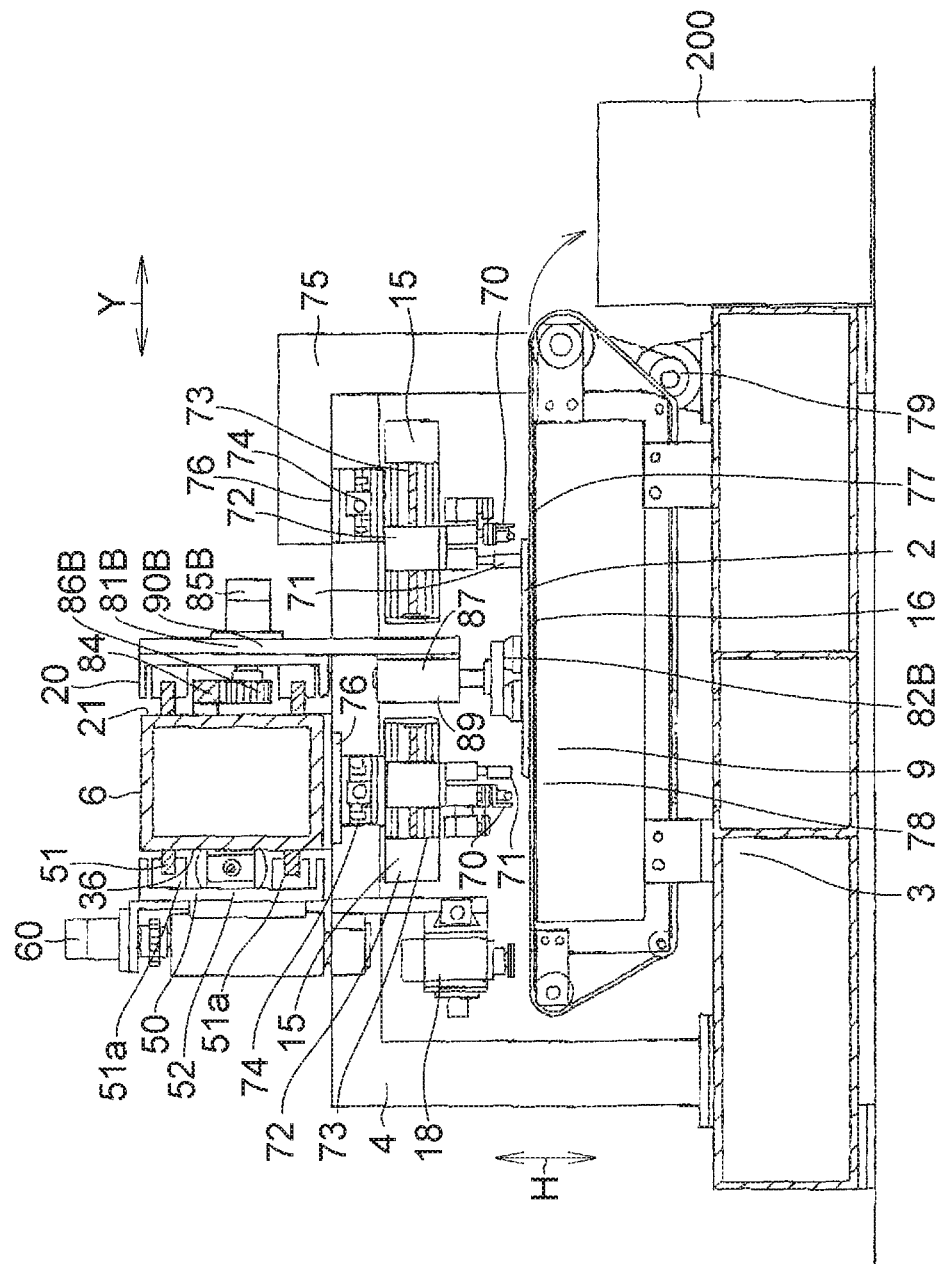
FIG. 4 is an explanatory cross-sectional view taken in the direction of arrows along line IV-IV of FIG. 1.
Figure 5:
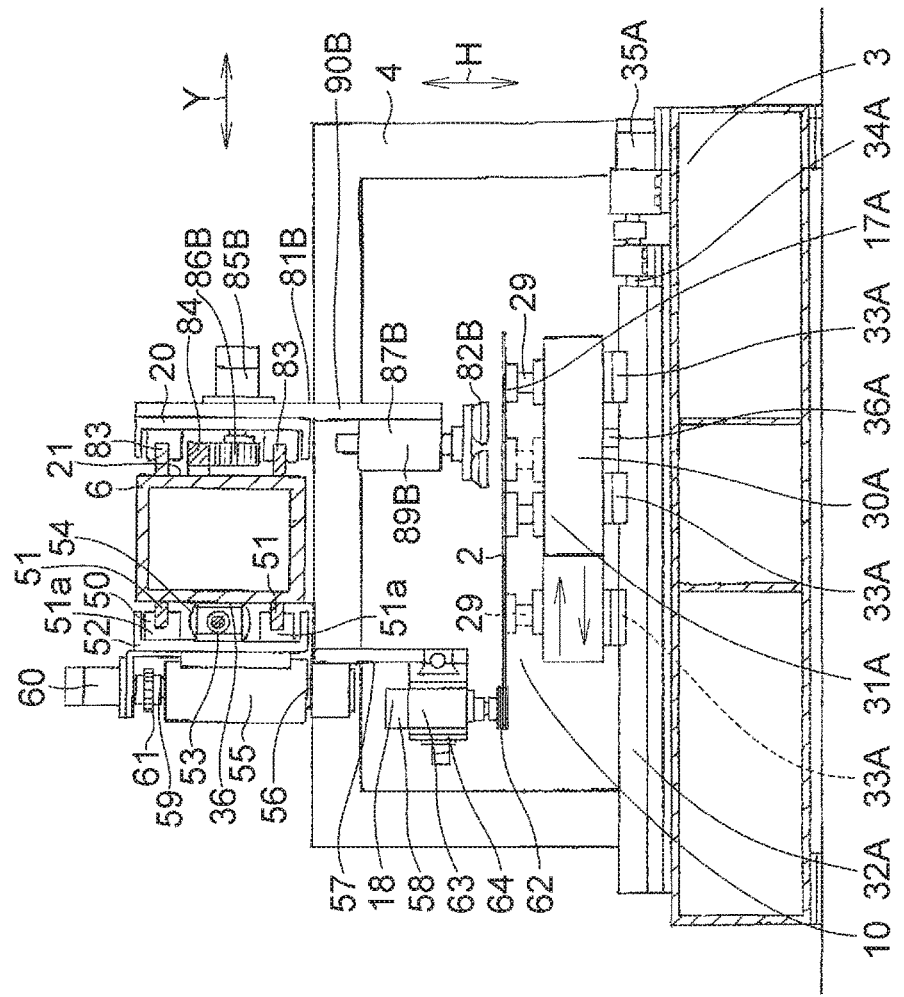
FIG. 5 is an explanatory cross-sectional view taken in the direction of arrows along line V-V of FIG. 1.

In FIGS. 1 to 5, a glass-plate working apparatus 1 in accordance with this embodiment has a base 3 which is installed on a floor surface, a pair of supporting columns 4 are respectively erected uprightly at both ends, in an X direction which is one direction in a horizontal plane (hereafter referred to as the X-axis direction), of the base 3, and a mount 6 is provided on the supporting columns 4 in such a manner as to bridge the supporting columns 4 and extend in the X-axis direction.

The glass-plate working apparatus 1, which effects processing with respect to a glass plate 2 including the formation of a scribe line (a cut line, i.e., a bend-breaking line) on the glass plate 2, the bend-breaking of the glass plate 2 along the scribe line, and the grinding of peripheral edges of the bend-broken glass plate 2, is provided with a feeding position 7, a scribing position 8, a bend-breaking position 9, a grinding position 10, and a discharging position 11.

A feeding table 12 is provided in the feeding position 7. A scribe worktable 13 and a scribe head 14 are provided in the scribing position 8. A pair of bend-breaking devices 15 and a bend-breaking belt conveyor 16 are provided in the bend-breaking position 9. Two grinding worktables 17A and 17B and one grinding head 18 are provided in the grinding position 10. A discharge conveyor 19 is provided in the discharging position 11. A glass-plate transporting device 20 is provided on a rear surface 21 of the mount 6 along the mount 6, i.e., along the X-axis direction, above the feeding table 12, the scribe worktable 13, the bend-breaking belt conveyor 16, the two grinding worktables 17A and 17B, and the discharge conveyor 19 which are arranged in series along the X-axis direction.

The scribe worktable 13 has a table body 22 for planarly supporting the glass plate 2 by an upper surface thereof, a pair of table supporting bases 23 for fixedly supporting the table body 22, and a Y-axis moving means 24 for moving the table supporting bases 23 in a Y direction (hereafter referred to as the Y-axis direction) perpendicular to the X-axis direction within a horizontal plane.

The Y-axis moving means 24 includes two guide rails 25 juxtaposed on an upper surface of the base 3 along the Y-axis direction, a Y-axis moving base 26 installed on a pair of slide blocks respectively held on the guide rails 25 movably in the Y-axis direction, a rotatable feed screw 27 connected to the Y-axis moving base 26 by means of a screw nut and provided between the guide rails 25, and a Y-axis control motor 28 coupled to one end of the feed screw 27. The table body 22, which is mounted on the Y-axis moving base 26 via the table supporting bases 23, is adapted to move in the Y-axis direction by the movement in the Y-axis direction of the Y-axis moving base 26 through the screw nut as the feed screw 27 is rotated by the driving of the Y-axis control motor 28.

The scribe head 14, which is moved in the X-axis direction in correspondence with the width in the X-axis direction of the table body 22, is provided on a front surface 36 of the mount 6 via an X-axis moving means 37.

The X-axis moving means 37 includes two guide rails 49 juxtaposed on the front surface 36 in a range in the X-axis direction exceeding the width in the X-axis direction of the table body 22, an X-axis moving base 38 fixed to a pair of slide blocks respectively held on the guide rails 49 movably in the X-axis direction, a rotatable feed screw 39 provided on the front surface 36 between the guide rails 49, and an X-axis control motor 40 coupled to the feed screw 39.

A bearing unit 41 mounted on the X-axis moving base 38 has a rotating shaft 42 with the scribe head 14 mounted at its lower end portion by means of a bracket 43, so as to hold the rotating shaft 42 rotatably with respect to the X-axis moving base 38 by means of a built-in bearing (not shown), and is provided with a rotational axis perpendicular to an X-Y plane which is a horizontal plane, i.e., the upper surface of the glass plate 2. A scribe head body 44 is mounted at a lower end portion of the rotating shaft 42 by means of the bracket 43, while an output rotating shaft of an angle control motor 45 is coupled to an upper end portion of the rotating shaft 42 via a pair of spur gears 44a and 44b meshing with each other.

The scribe head 14 has, in addition to the rotating shaft 42, the bracket 43 mounted at the lower end portion of the rotating shaft 42 and the scribe head body 44. The scribe head body 44 includes a cutter head 47 having a cutter wheel 46 at a lower end thereof and an air cylinder unit 48 which is mounted on an upper portion of the cutter head 47, vertically moves the cutter wheel 46, and imparts cutting pressure to the cutter wheel 46 during scribing.

The angle control motor 45 is adapted to adjust the orientation of a blade edge of the cutter wheel 46 to the scribing direction by allowing the cutter wheel 46 disposed on the rotational axis of the rotating shaft 42 to be angularly controlled about the rotational axis perpendicular to the upper surface of the glass plate 2 through the spur gears 44a and 44b and the rotating shaft 42.

Each of the two grinding worktables 17A and 17B, which are respectively moved in the Y-axis direction independently of each other while sucking the glass plate 2 on the upper surface thereof, has a plurality of suction pads 29 for sucking the glass plate 2 on the upper surface thereof as well as a corresponding one of table bases 30A and 30B on which the respective ones of the suction pads 29 are detachably mounted. The table bases 30A and 30B are respectively mounted on a pair of Y-axis moving means 31A and 31B.

The Y-axis moving means 31A for the table base 30A includes a pair of guide rails 32A juxtaposed on the upper surface of the base 3 along the Y-axis direction; a pair of slide blocks 33A secured to the table base 30A and held by the guide rails 32A movably in the Y-axis direction; a feed screw 34A provided rotatably on the upper surface of the base 3 between the guide rails 32A in the X-axis direction; a nut 36A secured on one side thereof to the table base 30A and threadedly engaged with the feed screw 34A on the other side thereof; and a Y-axis control motor 35A coupled to one end of the feed screw 34A. The grinding worktable 17A having the table base 30A is adapted to move in the Y-axis direction while being guided by the guide rails 32A as the Y-axis control motor 35A is driven.

In the same way as the Y-axis moving means 31A, the Y-axis moving means 31B for the table base 30B includes a pair of guide rails 32B juxtaposed on the upper surface of the base 3 along the Y-axis direction; a pair of slide blocks 33B held by the guide rails 32B movably in the Y-axis direction; a feed screw 34B provided rotatably on the upper surface of the base 3 between the guide rails 32B in the X-axis direction; a nut 36B secured on one side thereof to the table base 30B and threadedly engaged with the feed screw 34B on the other side thereof; and a Y-axis control motor 35B coupled to one end of the feed screw 34B. The grinding worktable 17B having the table base 30B is adapted to move in the Y-axis direction while being guided by the guide rails 32B as the Y-axis control motor 35B is driven.

The one grinding head 18, which moves in the X-axis direction alternately in correspondence with the movement in the Y-axis direction of the grinding worktables 17A and 17B, is provided on the front surface 36 of the mount 6 via an X-axis moving means 50. The X-axis moving means 50 includes a pair of guide rails 51 juxtaposed on the mount 6 in a moving range in the X-axis direction corresponding to the range of disposition in the X-axis direction of the grinding worktables 17A and 17B; an X-axis moving base 52 fixed integrally with a pair of slide blocks 51a held by the respective guide rails 51 movably in the X-axis direction; a feed screw 53 connected to the X-axis moving base 52 by means of a nut and provided between the guide rails 51 in a vertical direction H; and an X-axis control motor 54 coupled to one end of the feed screw 53. The X-axis moving base 52 is moved in the X-axis direction with respect to the grinding worktables 17A and 17B as the X-axis control motor 54 is driven.

The grinding head 18 having a grinding head body 58 mounted on the X-axis moving base 52 via a bearing unit 55 is adapted to move in the X-axis direction alternately with respect to the grinding worktables 17A and 17B.

The bearing unit 55 mounted on the X-axis moving base 52 rotatably holds a rotating shaft 56 with an axis perpendicular to an X-Y planar coordinate system, i.e., the upper surface of the glass plate 2, by means of a bearing (not shown). The grinding head body 58 is mounted on a lower end portion of the rotating shaft 56 via a bracket 57, while a spur gear 61 meshing with the spur gear fitted to an output rotating shaft of an angle control motor 60 is mounted on an upper end portion 59 thereof.

The grinding head body 58 has a spindle motor 63 having an output rotating shaft with a grinding wheel 62 mounted thereon, as well as a slide unit 64 for adjusting in the perpendicular X-Y directions the position of the spindle motor 63 and, hence, the position of the grinding operation portion of the grinding wheel 62 with respect to the glass plate 2. The grinding head body 58 is adapted to effect the grinding of peripheral edges of the glass plate 2 constantly at a fixed angle with the grinding wheel 62 by positioning the grinding operation portion of the grinding wheel 62 on the rotational axis of the rotating shaft 56, by angularly controlling the rotating shaft 56 by means of the angle control motor 60, and by causing the grinding wheel 62 to oscillate about the grinding operation portion in correspondence with the peripheral configuration of the glass plate 2 which changes.

The bend-breaking position 9 has the bend-breaking belt conveyor 16 on which the glass plate 2 with the scribe line formed thereon in the scribing position 8 is placed and the two bend-breaking devices 15 for bend-breaking the glass plate 2 placed on the bend-breaking belt conveyor 16.

Each of the bend-breaking devices 15 has an end cutter unit 70, a press unit 71, and a moving means 72 for holding the end cutter unit 70 and the press unit 71 and moving them along the upper surface of the glass plate 2.

Each moving means 72 has a Y-axis moving device 73 for holding the end cutter unit 70 and the press unit 71 and moving them in the Y-axis direction under NC control, as well as an X-axis moving device 74 for holding the Y-axis moving device 73 and moving the same in the X-axis direction. One X-axis moving device 74 is mounted on the mount 6 by means of a bracket 76, and the other X-axis moving means 74 is mounted on an upright body 75, erected on the base 3, by means of a bracket 76.

The bend-breaking belt conveyor 16 has a conveyor belt 77, a supporting plate/frame 78 which supports the conveyor belt 77 from inside in a planar shape and is supported on the base 3, and a drive unit 79 for causing the conveyor belt 77 to circulatingly travel.

In the bend-breaking position 9, the glass plate 2 with the scribe line formed thereon in the scribing position 8 is placed on the bend-breaking belt conveyor 16 by suction pads 82A of a transporting shuttle 81A corresponding to the scribing position 8.

The transporting shuttle 81A which placed on the bend-breaking belt conveyor 16 the glass plate 2 with the scribe line formed thereon returns to the scribing position 8, and, in turn, suction pads 82B of a transporting shuttle 81B which returned to the bend-breaking position 9 are lowered, whereupon the glass plate 2 placed on the bend-breaking belt conveyor 16 by the transporting shuttle 81A is suckingly held and fixed by the suction pads 82B of the transporting shuttle 81B. The end cutter unit 70 of each bend-breaking device 15 is sequentially moved to necessary locations with respect to this fixed glass plate 2, and an end cut line is formed on the glass plate 2 by each end cutter unit 70. Subsequently, each press unit 71 is sequentially moved to necessary locations, and the glass plate 2 with the end cut lines formed thereon is pressed by each press unit 71 to bend-break and separate unnecessary portions. The glass plate 2 from which the unnecessary portions have been separated is sucked and lifted by the suction pads 82B of the corresponding transporting shuttle 81B in the bend-breaking position 9, and is, in this state, transported to the grinding worktable 17A or 17B. Meanwhile, the bend-breaking belt conveyor 16 is actuated to discharge to an outside 200 the bend-broken cullets consisting of the unnecessary portions.

The glass-plate transporting device 20 includes a pair of guide rails 83 laid on the rear surface 21 of the mount 6 in such a manner as to range from above the feeding table 12 to above the discharge conveyor 19; three transporting shuttles 81A, 81B, and 81C which are held by the guide rails 83 movably in the X-axis direction via slide blocks and linearly reciprocate in the X-axis direction while being guided by the guide rails 83; and a rack 84 provided between the guide rails 83 in the vertical direction H in juxtaposition thereto and used in common for the transporting shuttles 81A, 81B, and 81C.

The transporting shuttle 81A has a bracket 90A, a traveling motor 85A mounted on the bracket 90A, and a pair of glass-plate sucking and lifting devices 87A1 and 87A2; the transporting shuttle 81B has a bracket 90B, a traveling motor 85B mounted on the bracket 90B, and a glass-plate sucking and lifting devices 87B; and the transporting shuttle 81C has a bracket 90C, a traveling motor 85C mounted on the bracket 90C, and a glass-plate sucking and lifting devices 87C. Each of the brackets 90A, 90B, and 90C is supported by the pair of guide rails 83 via slide blocks movably in the X-axis direction.

A pinion gear 86A, a pinion gear 86B, and a pinion gear 86C are respectively mounted on an output rotating shaft of the traveling motor 85A, an output rotating shaft of the traveling motor 85B, and an output rotating shaft of the traveling motor 85C in such a manner as to respectively mesh with the gear rack 84.

The transporting shuttles 81A, 81B, and 81C are respectively adapted to reciprocatingly travel in the X-axis direction by necessary distances independently of each other as the respective traveling motors 85A, 85B, and 85C are independently driven under control.

The glass-plate sucking and lifting device 87A1 has a plurality of suction pads 82A1 for effecting the sucking of, and the releasing of suction of, the glass plate 2 and a lifting unit 89A1 to which the suction pads 82A1 are attached and which raises and lowers the suction pads 82A1. The glass-plate sucking and lifting device 87A2 has a plurality of suction pads 82A2 for effecting the sucking of, and the releasing of suction of, the glass plate 2 and a lifting unit 89A2 to which the suction pads 82A2 are attached and which raises and lowers the suction pads 82A2. The glass-plate sucking and lifting device 87B has a plurality of suction pads 82B for effecting the sucking of, and the releasing of suction of, the glass plate 2 and a lifting unit 89B to which the suction pads 82B are attached and which raises and lowers the suction pads 82B. The glass-plate sucking and lifting device 87C has a plurality of suction pads 82C for effecting the sucking of, and the releasing of suction of, the glass plate 2 and a lifting unit 89C to which the suction pads 82C are attached and which raises and lowers the suction pads 82C.

The transporting shuttle 81A having the two glass-plate sucking and lifting devices 87A1 and 87A2 is adapted to repeat reciprocating motion so as to effect replacement transport of the glass plate 2 from the feeding table 12 to the scribe worktable 13 and from the scribe worktable 13 to the bend-breaking belt conveyor 16, such that, as its traveling motor 85A is operated, at an end of its return movement in the X-axis direction, the transporting shuttle 81A causes the glass-plate sucking and lifting device 87A1 to be positioned above the feeding table 12 and the glass-plate sucking and lifting device 87A2 to be positioned above the scribe worktable 13 and, at an end of its forward movement, the transporting shuttle 81A causes the glass-plate sucking and lifting device 87A2 to be positioned above the bend-breaking belt conveyor 16 and the glass-plate sucking and lifting device 87A1 to be positioned above the scribe worktable 13.

As its traveling motor 85B is operated, the transporting shuttle 81B is moved reciprocatingly between above the bend-breaking belt conveyor 16 and above an alternate one of the grinding worktables 17A and 17B to allow the glass plate 2 bend-broken on the bend-breaking belt conveyor 16 to be transported alternately to the grinding worktable 17A and the grinding worktable 17B.

As its traveling motor 85C is operated, the transporting shuttle 81C alternately carries out the ground glass plates 2 on the grinding worktables 17A and 17B onto the discharge conveyor 19.

In the glass-plate working apparatus 1, concurrently with the start of its operation, the glass-plate transporting device 20 is operated, and the suction pads 82A1 are lowered at the feeding table 12 to suck and lift the glass plate 2, i.e., an unworked glass plate on the feeding table 12, and the transporting shuttle 81A is moved forwardly. When the suction pads 82A1 sucking the glass plate 2 reach above the scribe worktable 13, the suction pads 82A1 are lowered and release the suction of the glass plate 2 to place the glass plate 2 onto the scribe worktable 13. The emptied suction pads 82A1 are raised and return again to above the feeding table 12 by a returning movement of the transporting shuttle 81A.

In turn, simultaneously as the suction pads 82A2 corresponding to the scribe worktable 13 are returned to above the scribe worktable 13, the scribe head 14 and the scribe worktable 13 are moved in the X-Y coordinate plane, and a scribe line is formed on the glass plate 2 by the cutter wheel 46. Upon completion of the formation of this scribe line, the scribe head 14 and the scribe worktable 13 are returned to their points of origin. Next, the suction pads 82A2 which returned to above the scribe worktable 13 are lowered to suck and lift the glass plate 2 with the scribe line formed thereon. The glass plate 2 sucked and lifted by the suction pads 82A2 is transported toward the bend-breaking position 9 by the forward movement of the transporting shuttle 81A, and when the suction pads 82A2 sucking the glass plate 2 with the scribe line formed thereon reach the bend-breaking position 9, the suction pads 82A2 are lowered to release the suction of the unworked plate glass 2 with the scribe line formed thereon and place on the bend-breaking belt conveyor 16 the unworked plate glass 2 with the scribe line formed thereon, whereupon, the suction pads 82A2 are returned to above the scribe worktable 13. In turn, the transporting shuttle 81B corresponding to the bend-breaking position 9 is returned to the bend-breaking position 9 and lowers the suction pads 82B immediately, and the glass plate 2 with the scribe line formed thereon and placed on the bend-breaking belt conveyor 16 is sucked by the suction pads 82B and is pressed immovably against the bend-breaking belt conveyor 16. In this state, the respective bend-breaking devices 15 are operated, and each end cutter unit 70 and each press unit 71 are moved above the glass plate 2 with the scribe line formed thereon to effect end cutting and then pressing operation at necessary positions, thereby bend-breaking and separating unnecessary portions in the outer region along the scribe line and fabricating the cut-out glass plate 2. After the fabrication, the suction pads 82B which are continuing to suck the cut-out glass plate 2 are raised as they are, and lift the cut-out glass plate 2. In the state in which the glass plate 2 is thus being sucked and lifted by the suction pads 82B, the transporting shuttle 81B starts forward movement toward the grinding position 10, during which time, in the grinding position 10, the glass plate 2 being sucked by the suction pads 29 onto one grinding worktable 17A of the two grinding worktables 17A and 17B is being subjected to grinding at its peripheral edges by the X-Y coordinate movement of the one grinding worktable 17A and the grinding head 18. Meanwhile, the other grinding worktable 17B is returned to its point of origin, and in the state in which the processed glass plate 2 is being carried out by the transporting shuttle 81C, the suction pads 82B suck the cut-out glass plate 2 on the conveyor belt 77, are moved to above the grinding worktable 17B by the transporting shuttle 81B, and are lowered toward the grinding worktable 17B, and the suction pads 82B are released from sucking on the grinding worktable 17B to carry in and place that cut-out glass plate 2 onto the grinding worktable 17B. At the same time, the grinding worktable 17B sucks and fixes the received cut-out glass plate 2 by means of the suction pads 29 and advances toward the grinding area. Simultaneously with the completion of grinding on the grinding worktable 17A engaged in grinding operation in advance, the grinding head 18 advances to the grinding worktable 17B and undergoes X-Y coordinate movement together with the grinding worktable 17B to effect the grinding of peripheral edges of the newly cut-out glass plate 2 on the grinding worktable 17B.

In the above-described manner, with the glass-plate working apparatus 1, the grinding worktables 17A and 17B alternately move in the planar coordinate system together with the grinding head 18 and alternately repeat the operation in which while one grinding worktable 17A or 17B, while holding the glass plate 2, is effecting the grinding of the glass plate 2 by the grinding head 18, the other grinding worktable 17B or 17A effects the discharging of the glass plate 2 and the receiving of the glass plate 2, and the grinding head 18 is thus adapted to effect the grinding of peripheral edges of the glass plates 2 on a continual basis.

Second Embodiment

Figure 6:
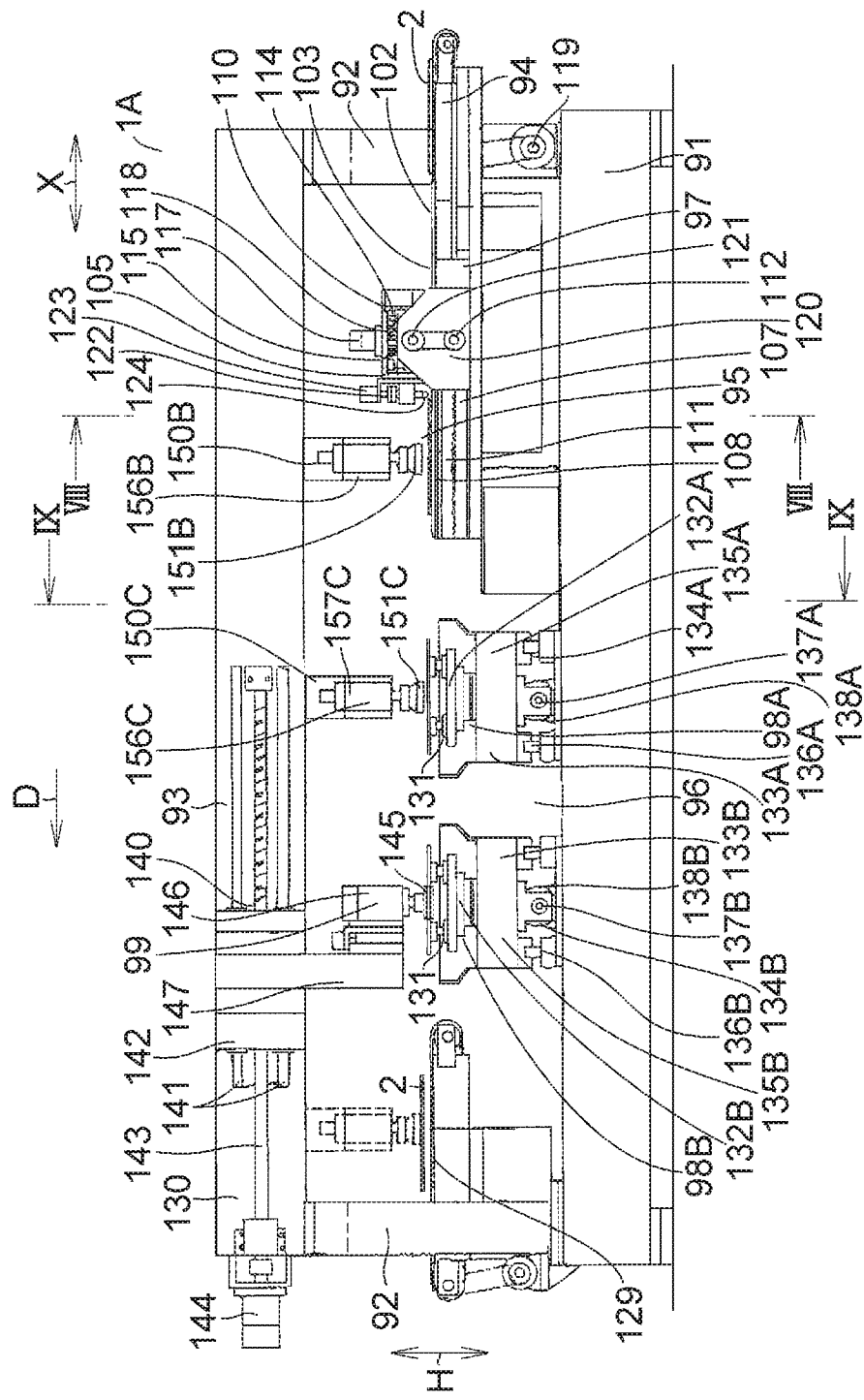
FIG. 6 is an explanatory front elevational view of another embodiment of the present invention.
Figure 7:
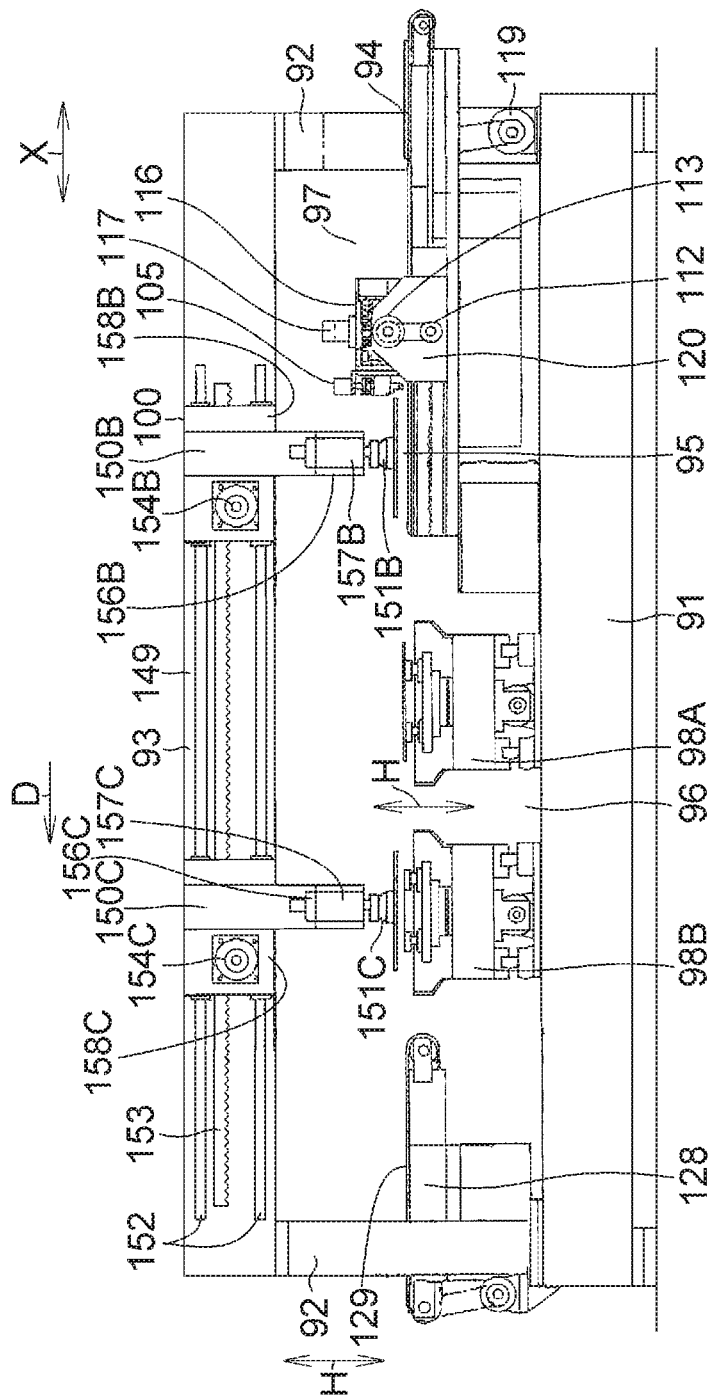
FIG. 7 is an explanatory rear view of the embodiment shown in FIG. 6.
Figure 8:
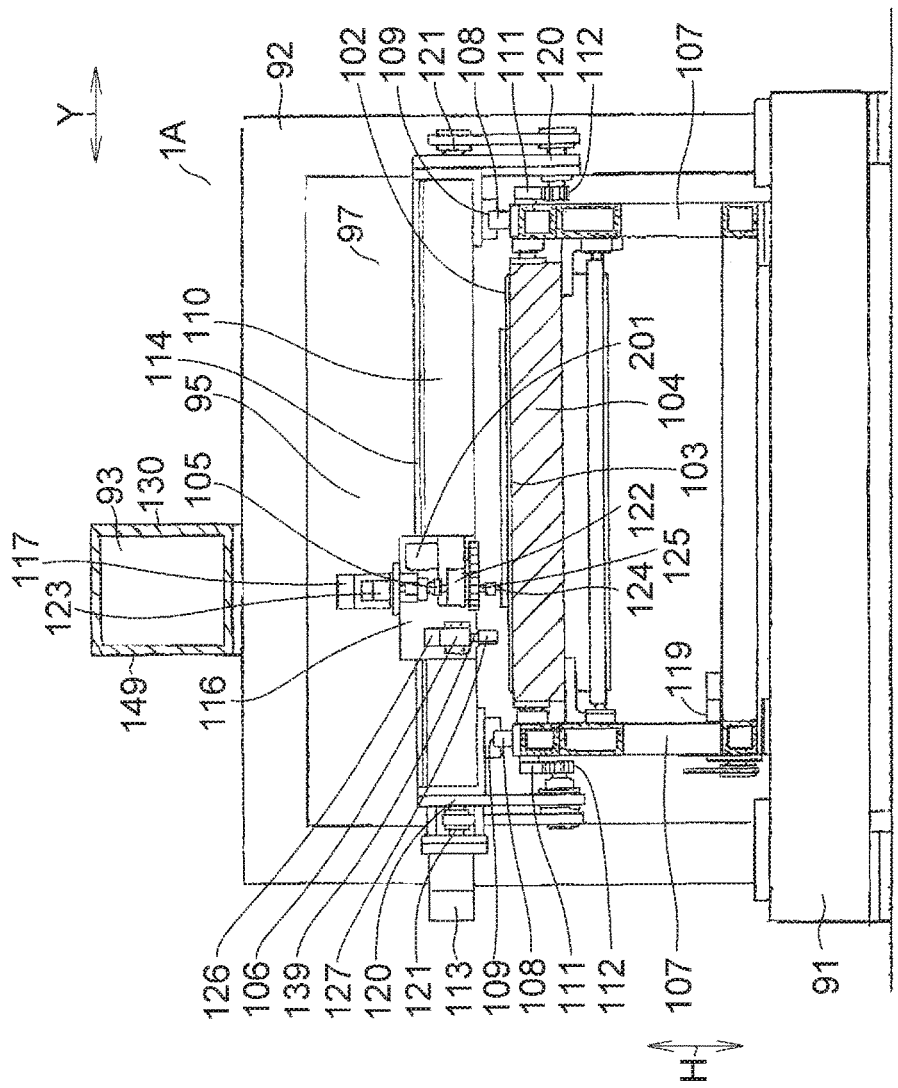
FIG. 8 is an explanatory cross-sectional view taken in the direction of arrows along line VIII-VIII of FIG. 6.
Figure 9:
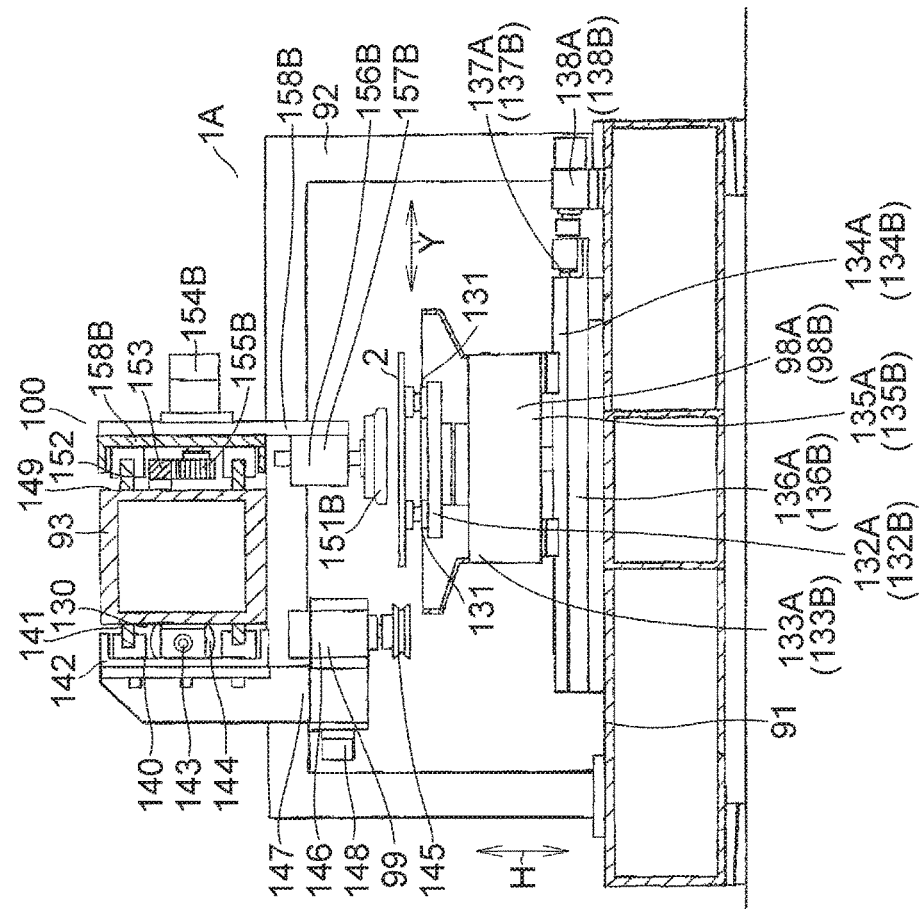
FIG. 9 is an explanatory cross-sectional view taken in the direction of arrows along line IX-IX of FIG. 6.

A glass-plate working apparatus 1A in accordance with this embodiment shown in FIGS. 6 to 9 also has a base 91 which is installed on the floor surface, and a pair of supporting columns 92 are respectively erected uprightly at both ends in the X-axis direction of the base 91. A mount 93 is installed on the supporting columns 92 in such a manner as to bridge the supporting columns 92 and extend in the X-axis direction. The glass-plate working apparatus 90 is provided with a feeding position 94, a scribing and bend-breaking position 95, a grinding position 96, and a discharging position 128. In the scribing and bend-breaking position 95, the formation of a scribe line on the glass plate 2 and the bend-breaking and separation of the glass plate 2 with the scribe line formed thereon (fabrication of the cut-out glass plate 2) are performed with the glass plate 2 fixed at the same position.

A scribe line/end cut line forming and pressing device 97 is provided in the feeding position 94 and the scribing and bend-breaking position 95; two grinding worktables 98A and 98B and one grinding head 99 are provided in the grinding position 96; and a discharge conveyor 129 is provided in the discharging position 128.

The scribe line/end cut line forming and pressing device 97, the grinding worktables 98A and 98B, and the discharge conveyor 129 are arranged in series along the mount 93, i.e., along the X-axis direction, and at necessary intervals. A glass-plate transporting device 100 is provided in such a manner as to extend linearly above the scribe line/end cut line forming and pressing device 97, the grinding worktables 98A and 98B, and the discharge conveyor 129.

The scribe line/end cut line forming and pressing device 97 includes a belt conveyor table 102 for planarly supporting and transporting the glass plate 2 and stopping the glass plate 2 at a predetermined position, as well as a scribe head 105 and a bend-breaking device 106 which move in the X-Y planar coordinate system in parallel with the upper surface of the belt conveyor table 102.

The belt conveyor table 102 includes a wide conveyor belt 103, a supporting base 104 for planarly supporting the conveyor belt 103 from the underside, and an NC control motor 119 for causing the conveyor belt 103 to travel under NC control.

The feeding position 94 and the scribing and bend-breaking position 95 are respectively formed on one side in the X-axis direction and on the other side in the X-axis direction with a central region in the X-axis direction of the upper surface of the conveyor belt 103 interposed therebetween.

A pair of guide rails 108 are provided on a main body frame 107 along the X-axis direction on each opposite side in the Y-axis direction of the belt conveyor table 102 mounted along the X-axis direction on the inner side of the main body frame 107, and a pair of slide blocks 109 are held by the respective guide rails 108 movably in the X-axis direction. Above the belt conveyor table 102, a traveling frame 110 is installed on the slide blocks 109 by means of a pair of brackets 120 at both ends in the Y-axis direction which is a direction perpendicular to the X-axis direction in the horizontal plane.

The traveling frame 110, which is supported by the slide blocks 109 respectively fitted over the guide rails 108 movably in the X-axis direction, is movable in the X-axis direction by being guided by the guide rails 108. On each opposite side of the belt conveyor table 102, a rack 111 extending in the X-axis direction in parallel with the guide rail 108 is provided on each side of the main body frame 107.

A pinion gear 112 meshing with the corresponding rack 111 is rotatably mounted on each bracket 120 mounted on each opposite side in the Y-axis direction of the traveling frame 110.

A shaft 121 is rotatably fitted in the traveling frame 110 in such a manner as to penetrate the respective brackets 120. Each opposite end portion in the Y-axis direction of the shaft 121 is coupled to the corresponding pinion gear 112 via a pulley and a belt, and an output rotating shaft of an X-axis servo motor 113 is connected to one end portion of the shaft 121. The traveling frame 110 is moved in the X-axis direction by the rotation of the respective pinion gear 112 through the pulley and the belt due to the operation of the X-axis servo motor 113 and by the meshing between the respective ones of the pinion gear 112 and the rack 111.

On the traveling frame 110, a pair of guide rails 114 and a rack 115 along the guide rails 114 are juxtaposed along the Y-axis direction, respectively. A bracket 116 is mounted on slide blocks held by the guide rails 114 movably in the Y-axis direction, and the bracket 116 is movable in the Y-axis direction by being guided by the pair of guide rails 114. A Y-axis servo motor 117 is mounted on the bracket 116, and a pinion gear 118 meshing with the rack 115 is mounted on an output rotating shaft of the Y-axis servo motor 117. The bracket 116 is moved in the Y-axis direction by being guided by the pair of guide rails 114 as the Y-axis servo motor 117 is operated.

The scribe head 105 and the bend-breaking device 106 are juxtaposed on a front surface of the bracket 116. The scribe head 105 and the bend-breaking device 106 integrally undergoes X-Y planar coordinate movement by the movement in the X-axis direction of the traveling frame 110 and the movement in the Y-axis direction of the bracket 116 above the belt conveyor table 102.

The scribe head 105 includes a cutter head 122 having a cutter wheel 124 at a lower end of the rotating shaft 125; an air cylinder unit 123 which is mounted on an upper portion of a rotating shaft 125, vertically moves the cutter wheel 46 via the rotating shaft 125, and imparts cutting pressure to the cutter wheel 124 via the rotating shaft 125 during scribing; and a angle control motor 201 for adjusting the orientation of a blade edge of the cutter wheel 124 to the scribing direction and the end cutting direction by allowing the rotating shaft 125 with the cutter wheel 124 mounted thereon to be angularly controlled about the rotational axis of the rotating shaft 125. An output rotating shaft of the angle control motor 201 is coupled to the rotating shaft 125 via a pair of mutually meshing spur gears. The bend-breaking device 106 applies pressing pressure to necessary portions of the glass plate 2 with the end cut line formed thereon by a pusher 127 via a rod 139, which is movable in the vertical direction H, by means of hydraulic or pneumatic pressure of a hydraulic or pneumatic cylinder 126, to thereby bend-break unnecessary portions and fabricating the cut-out glass plate 2.

In the scribing and bend-breaking position 95, the scribe head 105 and the bend-breaking device 106 are integrally moved under NC control by using the scribe head 105 as a reference on the basis of scribe forming information stored in advance. First, the scribe head 105 is operated to form a scribe line on the glass plate 2, and subsequently to the end cut line formation after the formation of the scribe line the scribe head 105 and the bend-breaking device 106 are integrally moved under NC control by using the bend-breaking device 106 as a reference on the basis of bend-breaking information stored in advance. The bend-breaking device 106 is moved to each of a plurality of positions requiring pressing, the bend-breaking device 106 is operated at each of these positions to sequentially apply pressing pressure to the glass plate 2, thereby bend-breaking and separating unnecessary regions from the glass plate 2 and fabricating the cut-out glass plate 2. After the fabrication of the cut-out glass plate 2, a transporting shuttle 150B returns to above the cut-out glass plate 2 and lowers a suction pad 151B to suck and lift the cut-out glass plate 2, and transports it to the grinding position 96.

In the grinding position 96, the grinding head 99 provided on the mount 93 via an X-axis direction moving means 140 moves alternately to positions corresponding to the grinding worktables 98A and 98B, and undergoes polar coordinate operation at the respective positions together with the grinding worktables 98A and 98B.

Each of the grinding worktables 98A and 98B sucks the glass plate 2 on the upper surface thereof, moves in the Y-axis direction while subjecting the glass plate 2 to angularly controlled rotation under NC control, and undergoes polar coordinate operation together with the grinding head 99 which is fixed, to thereby effect the polar coordinate grinding of peripheral edges of the glass plate 2 by a grinding wheel 145 of the grinding head 99.

Namely, in the grinding position 96, work coordinate systems are respectively provided for the respective positions of the grinding worktables 98A and 98B, and the grinding head 99 is adapted to move along the X-axis direction alternately to the corresponding positions of the respective work coordinate systems and stop thereat. In the work coordinate system where the grinding head 99 stopped, the glass plate 2 is adapted to undergo polar coordinate operation with respect to the grinding head 99 which stopped, by the angular controlled rotation of the glass plate 2 by the grinding worktable 98A or 98B and by the movement in the Y-axis direction of the glass plate 2 by the grinding worktable 98A or 98B. Thus, the grinding worktables 98A and 98B are adapted to undergo angularly controlled rotation and Y-axis movement independently of each other.

The grinding worktable 98A includes a plurality of suction pads 131 for sucking the glass plate 2 on an upper surface thereof, a table base 132A onto which the suction pads 131 are sucked to support the suction pads 131, and a main body unit 133A for rotatably bearing and holding the table base 132A and for subjecting the table base 132A to angularly controlled rotation under NC control.

A Y-axis moving means 134A for moving the grinding worktable 98A in the Y-axis direction includes two guide rails 136A juxtaposed on an upper surface of the base 91 along the Y-axis direction, a Y-axis moving base 135A installed on a pair of slide blocks respectively held on the guide rails 136A movably in the Y-axis direction and incorporating the main body unit 133A, a feed screw 137A connected to the Y-axis moving base 135A by means of a nut and provided between the guide rails 136A, and a Y-axis control motor 138A whose output rotating shaft is coupled to one end of the feed screw 137A. The grinding worktable 98A is mounted on the Y-axis moving base 135A, and is adapted to be moved in the Y-axis direction through the movement in the Y-axis direction of the Y-axis moving base 135A as the Y-axis control motor 138A is driven.

The grinding worktable 98B includes the plurality of suction pads 131 for sucking the glass plate 2 on an upper surface thereof, a table base 132B onto which the suction pads 131 are sucked to support the suction pads 131, and a main body unit 133B for rotatably bearing and holding the table base 132B and for subjecting the table base 132B to angularly controlled rotation under NC control.

A Y-axis moving means 134B for moving the grinding worktable 98B in the Y-axis direction includes two guide rails 136B juxtaposed on an upper surface of the base 91 along the Y-axis direction, a Y-axis moving base 135B installed on a pair of slide blocks respectively held on the guide rails 136B movably in the Y-axis direction and incorporating the main body unit 133B, a feed screw 137B connected to the Y-axis moving base 135B by means of a nut and provided between the guide rails 136B, and a Y-axis control motor 138B whose output rotating shaft is coupled to one end of the feed screw 137B. The grinding worktable 98B is mounted on the Y-axis moving base 135B, and is adapted to be moved in the Y-axis direction through the movement in the Y-axis direction of the Y-axis moving base 135B as the Y-axis control motor 138B is driven.

The X-axis direction moving means 140 for moving the grinding head 99 in the X-axis direction includes a pair of position guide rails 141 mounted on a front surface 130 of the mount 93 in such a manner as to extend in the X-axis direction in correspondence with the grinding worktables 98A and 98B, an X-axis direction moving base 142 integrally fixed to a pair of slide blocks respectively held on the guide rails 141 movably in the X-axis direction, a feed screw 143 connected to the X-axis direction moving base 142 by means of a nut and provided between the guide rails 141, and an X-axis direction control motor 144 coupled to one end of the feed screw 143.

As the X-axis control motor 144 is driven, the X-axis direction moving base 142 and, hence, the grinding head 99 mounted on the X-axis direction moving base 142 by means of a bracket 147 advance alternately to the positions corresponding to the respective work coordinate systems of the grinding worktables 98A and 98B, and effect polar coordinate operation together with the grinding worktable 98A or 98B.

A spindle motor 146 is mounted at a lower end portion of the bracket 147 via a slide unit 148 for adjusting the position in the Y-axis direction of the grinding wheel 145, and the grinding wheel 145 is fitted to an output rotating shaft of the spindle motor 146.

The glass-plate transporting device 100 provided on a rear surface 149 of the mount 93 includes two transporting shuttles 150B and 150C; a pair of guide rails 152 juxtaposed on a rear surface of the mount 93 in such a manner as to range in the X-axis direction from above the scribing and bend-breaking position 95 of the scribe line/end cut line forming and pressing device 97 to above the discharge conveyor 129; and a rack 153 juxtaposed between the guide rails 152. The transporting shuttles 150B and 150C are held by the guide rails 152 movably in the X-axis direction via slide blocks and are adapted to linearly reciprocate in the X-axis direction.

The transporting shuttle 150 has a plate bracket 158B mounted on a pair of slide blocks respectively held by the guide rails 152 movably in the X-axis direction, a traveling servo motor 154B mounted on the plate bracket 158B, and a pinion gear 155B which is fitted to an output rotating shaft of the traveling servo motor 154B and meshes with the rack 153.

The transporting shuttle 150C has a plate bracket 158C mounted on a pair of slide blocks respectively held by the guide rails 152 movably in the X-axis direction, a traveling servo motor 154C mounted on the plate bracket 158C, and a pinion gear which is fitted to an output rotating shaft of the traveling servo motor 154C and is equivalent to the pinion gear 155B meshing with the rack 153.

As the traveling servo motors 154B and 154C of the transporting shuttles 150B and 150C are independently driven under NC control, the transporting shuttles 150B and 150C are respectively adapted to reciprocatingly travel under NC control by a necessary distance in the X-axis direction.

The transporting shuttle 150B has one glass-plate sucking and lifting device 156B mounted on the plate bracket 158B, and the transporting shuttle 150C has one glass-plate sucking and lifting device 156C mounted on the plate bracket 158C. The glass-plate sucking and lifting device 156B has a suction pad 151B for effecting the sucking of, and the releasing of suction of, the glass plate 2 at a lower end thereof and a lifting unit 157B to which the suction pad 151B is attached and which raises and lowers the suction pad 151B in the vertical direction H. The glass-plate sucking and lifting device 156C has a suction pad 151C for effecting the sucking of, and the releasing of suction of, the glass plate 2 at a lower end thereof and a lifting unit 157C to which the suction pad 151C is attached and which raises and lowers the suction pad 151C in the vertical direction H. The glass-plate sucking and lifting device 156B is mounted on the plate bracket 158B at the lifting unit 157B thereof, and the glass-plate sucking and lifting device 156C is mounted on the plate bracket 158C at the lifting unit 157C thereof.

The glass-plate working apparatus 1A includes the grinding worktables 98A and 98B which undergo angularly controlled rotation independently of each other and movement in the Y-axis direction perpendicular to a transporting direction D of the glass plate 2 parallel to the X-axis direction, as well as the grinding head 99 which moves in a planar polar coordinate system alternately with the grinding worktables 98A and 98B. The grinding worktables 98A and 98B are arranged in series in parallel with the transporting direction D of the glass plate 2, and the grinding head 99 is moved alternately to positions corresponding to the respective grinding worktables 98A and 98B without returning to its point of origin. When the grinding head 99 is positioned with respect to one grinding worktable 98A, this one grinding worktable 98A undergoes y-axis movement while, under angular control, rotating the glass plate 2 sucked on the upper surface thereof and effects the grinding of peripheral edges of the glass plate 2 by moving the glass plate 2 in the polar coordinate system in cooperation with the grinding head 99, during which grinding operation the other grinding worktable 98B effects the discharging of the ground glass plate 2 by the transporting shuttle 150C and the receiving of a new glass plate 2 by the transporting shuttle 150B. Thus, with the glass-plate working apparatus 1A, the above-described operation is alternately repeated, and hence the grinding head 99 is adapted to proceed with the grinding of peripheral edges of the glass plates 2 on a continual basis.

DESCRIPTION OF REFERENCE NUMERALS

1: glass-plate working apparatus
2: glass plate

3: base
7: feeding position
8: scribing position
9: bend-breaking position
10: grinding position
17A, 17B: grinding worktable
18: grinding head

The invention claimed is:

1. A glass-plate working apparatus comprising:
two grinding worktables which undergo NC controlled movement or angularly controlled rotation independently of each other; and
a grinding head which undergoes NC controlled movement in correspondence with the two grinding worktables,
each of the two grinding worktables having a suction pad for sucking a glass plate on an upper surface thereof and a table base on which the suction pad is detachably mounted,
wherein the two grinding worktables alternately move in a planar coordinate system in cooperation with the grinding head and alternately repeat operation in which while one of the grinding worktables, while holding a glass plate, is effecting the grinding of the glass plate by the grinding head, another one of the grinding worktables effects an operation of discharging the glass plate and receiving a next glass plate, to thereby allow the grinding head to effect the grinding of consecutively received glass plates on a continual basis.

2. A glass-plate working apparatus comprising:
a glass-plate transporting device;
two grinding worktables which move independently of each other in a Y-axis direction perpendicular to a direction of transporting a glass plate by the glass-plate transporting device and which are arranged in the transporting direction of the glass plate; and
a grinding head which moves in an X-axis direction parallel to the transporting direction,
each of the two grinding worktables having a suction pad for sucking the glass plate on an upper surface thereof and a table base on which the suction pad is detachably mounted,
wherein the two grinding worktables are adapted to alternately repeat an operation of grinding a held glass plate by the grinding head and an operation of, during the grinding, discharging a ground glass plate and receiving and holding a next glass plate, and the grinding head is adapted to move in an X-Y planar coordinate system in a changing manner with the grinding worktable holding the glass plate and effect grinding on a continual basis.

3. The glass-plate working apparatus according to claim 2, wherein said glass-plate transporting device comprises transporting shuttles which reciprocatingly move independently of each other, the transporting shuttles being respectively adapted to linearly reciprocate under NC control between a corresponding one of the grinding worktables and a glass-plate cutting-out position.

4. The glass-plate working apparatus according to claim 3, wherein the transporting shuttle has a suction pad, and, in a scribing device or a bend-breaking device, in a state in which a region inside a scribe line of an unworked glass plate is being sucked by the suction pad, the glass plate is cut out from the unworked glass plate postured with the scribe line formed thereon, and is transported to the grinding worktable.

5. A glass-plate working apparatus comprising:
two grinding worktables which undergo angularly controlled rotation independently of each other and move in a Y-axis direction perpendicular to a transporting direction of a glass plate; and
a grinding head which moves in a planar coordinate system alternately in cooperation with each of the two grinding worktables,
each of the two grinding worktables having a suction pad for sucking the glass plate on an upper surface thereof and a table base on which the suction pad is detachably mounted,
the two grinding worktables being arranged in series in the transporting direction of the glass plate,
the grinding head being adapted to move in an X-axis direction which is the transporting direction of the glass plate, so as to be disposed alternately at a position corresponding to each of the two grinding worktables,
wherein the two grinding worktables alternately repeat operation in which while one of the grinding worktables, while holding a glass plate, is effecting the grinding of the glass plate by the grinding head, another one of the grinding worktables effects an operation of discharging the glass plate and receiving a next glass plate, to thereby allow the grinding head to proceed with grinding on a continual basis.

6. The glass-plate working apparatus according to claim 5, wherein the two grinding worktables are adapted to undergo angularly controlled rotation independently of each other, and the grinding head is adapted to undergo X-axis movement or Y-axis movement along an X-axis with respect to each of the grinding worktables.

* * * * *